(12) United States Patent
Badets et al.

(10) Patent No.: US 8,374,280 B2
(45) Date of Patent: Feb. 12, 2013

(54) ULTRA WIDE BAND PULSE GENERATOR PROVIDED WITH AN INTEGRATED FUNCTION FOR DIGITAL FILTERING EMULATION, AND TRANSMISSION METHOD

(75) Inventors: Franck Badets, Voiron (FR); David Marchaland, Viuz en Sallaz (FR)

(73) Assignee: STMicroelectronics SA, Montrouge (FR)

( * ) Notice: Subject to any disclaimer, the term of this patent is extended or adjusted under 35 U.S.C. 154(b) by 1212 days.

(21) Appl. No.: 12/012,499

(22) Filed: Jan. 31, 2008

(65) Prior Publication Data

US 2008/0205486 A1  Aug. 28, 2008

(30) Foreign Application Priority Data

Jan. 31, 2007  (FR) ...................... 07 00683

(51) Int. Cl.
*H04L 27/00* (2006.01)
(52) U.S. Cl. ........................ 375/295; 327/291
(58) Field of Classification Search .............. 375/295
See application file for complete search history.

(56) References Cited

U.S. PATENT DOCUMENTS 5,991,308 A * 11/1999 Fuhrmann et al. ....... 370/395.53
7,671,971 B2 * 3/2010 Aebischer et al. ......... 356/5.09
2003/0066094 A1 * 4/2003 van der Schaar et al. ..... 725/151
2003/0156603 A1 * 8/2003 Rakib et al. ............... 370/485
2004/0057256 A1 * 3/2004 Feldtkeller ............... 363/21.01
2006/0029358 A1 * 2/2006 Mahgerefteh et al. ......... 386/33
2006/0202744 A1 * 9/2006 Utsuno ....................... 327/538
2009/0213942 A1 * 8/2009 Holm et al. ................ 375/259

FOREIGN PATENT DOCUMENTS

EP  1475935  11/2004
WO  0197936  12/2001

OTHER PUBLICATIONS

French Search Report, for French Application Serial No. FR0700683, Institut National De La Propriete Industrielle (INPI), Aug. 13, 2007.
Tony Q. S. Queck, Moe Z. Win and Davide Dardari, "UWB Transmitted Reference Signaling Schemes—Part I: Performance Analysis", Ultra-Wideband, 2005 IEEE International Conference on Zurich, Switzerland Sep. 5-8, 2005, Piscataway, NJ, USA, IEEE, Sep. 5, 2005, pp. 587-592, XP010872570.

* cited by examiner

Primary Examiner — Erin File
(74) Attorney, Agent, or Firm — Graybeal Jackson LLP (57) ABSTRACT

An embodiment of the invention relates to a method for transmission by ultra-wide-band pulses of digital data formed with a flow of information elements, this method comprising at least one operation including sequentially encoding the information elements by modulating an oscillating signal In order to avoid the use of a bandpass filter, the oscillating signal is modulated in amplitude depending on the identity or dissimilarity of each information element relative to the preceding information element.

39 Claims, 3 Drawing Sheets

ULTRA WIDE BAND PULSE GENERATOR PROVIDED WITH AN INTEGRATED FUNCTION FOR DIGITAL FILTERING EMULATION, AND TRANSMISSION METHOD

PRIORITY CLAIM

This application claims priority from French patent application Ser. No. 07/00683, filed Jan. 31, 2007, which is incorporated herein by reference.

TECHNICAL FIELD

An embodiment of the present disclosure generally relates to the field of ultra-wide-band transmission of information.

More specifically, an embodiment of the disclosure in a non-limiting way relates to an ultra-wide-band-pulse generator suitable for transmitting digital data formed with a flow of information elements, each of which is encoded, for a time interval reciprocal of an encoding frequency, as a pulse train obtained by modulation of a signal from an oscillator and oscillating at a base frequency at least equal to three times the encoding frequency, this generator comprising in addition to the oscillator, at least one modulator coupled to this oscillator and applying to the oscillating signal, over each time interval, a modulation at least depending on the value of the information element to be encoded during this time interval.

BACKGROUND

The ultra-wide-band technique, which is known to those skilled in the art under the acronym UWB "ultra wide band" and which allows transmission of information, is based on the emission of pulses of very short duration, typically of a few nanoseconds, directly generated in the base band, generally modulated in position (PPM) and/or in polarity (BPSK), and therefore occupying a very wide frequency spectrum.

Design of UWB generators today may come up against a serious problem, which lies in the fact that the specifications imposed by the standards in effect as regards occupation of frequency bands and the repeating period of the pulses are not compatible, except if bandpass filters are used at the output of these generators.

However, the making of such filters may be both complex and costly.

SUMMARY

In this context, an embodiment relates to an ultra-wide-band pulse generator designed for getting rid of this constraint of output bandpass filters.

For this purpose, an embodiment of a generator comprises an addressing circuit and an encoding table, wherein the addressing circuit is able to contain at each instant a configuration of information elements including as information elements, an information element already encoded beforehand and an information element to be encoded, wherein the encoding table is coupled to the addressing circuit and contains at least four series of digital words, each word representing an amplitude encoded over at least two bits, wherein the coding table is designed so as to sequentially provide, during each time interval, the words of a selected series of digital words, from series contained in this table, depending on the configuration of information elements contained in the addressing circuit, wherein the modulator is an amplitude modulator assuming the form of a digital control amplifier, the gain of which is controlled by the digital words provided by the encoding table, and wherein the series of digital words selected over each time interval by the encoding table encodes by different respective amplitude changes, the different events formed by identity and by dissimilarity of the information elements of the configuration contained in the addressing circuit, as a result of which the passband of the pulses delivered by this generator is reduced.

Each series of digital words may comprise a number of words equal to an integer ratio of the base frequency to the encoding frequency.

The encoding table may then be timed, for example by the oscillator, in order to deliver digital words at the base frequency.

The digital words of the series contained in the encoding table may form for these series different respective amplitude profiles, these profiles may comprise a flat profile of zero amplitude, a profile increasing from zero amplitude to a non-zero amplitude, a profile decreasing from a non-zero amplitude to zero amplitude, and a flat profile of non-zero amplitude.

Each information element may represent a value assumed in the system including a zero value and at least one non-zero value, the encoding table may deliver words from the series of words having the flat profile of zero amplitude in response to a repetition of the information element of zero value, and the encoding table may deliver words from the series of words having the flat profile of non-zero amplitude in response to a repetition of an information element of non-zero value.

Each information element may represent a value assumed in the system including a zero value and at least one non-zero value, the encoding table may deliver the words from the series of words having the increasing profile in response to the occurrence of an information element of non-zero value following the information element of zero value, and the encoding table may deliver the words from the series of words having the decreasing profile in response to the occurrence of the information element of zero value following an information element of non-zero value.

The proposed generator may further comprise a phase modulator positioned downstream from the oscillator, each information element may then represent a value assumed in a ternary system including two values of opposite signs, and this phase modulator may apply to the oscillating signal which it receives from the oscillator or the amplitude modulator, during each time interval, a phase modulation depending at least on the sign of the information element to be encoded during this time interval.

In this case, the encoding table, for example, contains five series of digital words, the respective words of which form five different respective amplitude profiles, these amplitude profiles comprising a decreasing-increasing profile ranging between a non-zero amplitude and zero amplitude.

For example, the encoding table may deliver the words from the series of words having the decreasing-increasing profile in response to the occurrence of an information element affected with a first sign following the information element affected with the sign opposite to the first sign.

In an embodiment of the generator, the amplitude modulator may include a set of identical cells organized in successive blocks, each of which starting with the second one includes a number of cells of twice the number of cells of the preceding block, that these blocks are made to be selectively active or inactive by respective control signals respectively formed by successive bits of each of the digital words provided by the encoding table, and that each block, when it is active, contributes to the gain of this amplitude modulator in proportion to the number of cells which it contains.

An embodiment of the generator may have many advantages.

In particular, the whole architecture of this generator, except for the digital control amplifier, which may be made in current switching logic (or CML for Current Mode Logic), may be of the digital type.

Although this feature is optional, amplitude and phase modulations, if they are controlled by the same oscillator, are synchronous by design.

On the other hand they are asynchronous when they are controlled by two uncorrelated oscillators.

An embodiment of the generator is highly configurable, since it is sufficient to modify the digital words stored in the encoding table in order to adapt the shape of the produced pulse trains, which may have a triangular or Gaussian envelope.

An embodiment of the disclosure in a non-limiting way also relates to a method for transmitting by ultra-wide-band pulses digital data formed with a flow of information elements, this method comprising at least one operation of sequentially encoding the information elements by modulation of an oscillating signal, wherein the oscillating signal is amplitude-modulated depending of the identity or dissimilarity of each information element relatively to the preceding information element.

The events which form the identity and dissimilarity of each information element relatively to the preceding information element may be encoded by stability or a change in amplitude of the oscillating signal, respectively, or vice versa.

BRIEF DESCRIPTION OF THE DRAWINGS

Features and advantages of one or more embodiments of the disclosure will become apparent from the description which is made hereafter, as an indication and by no means as a limitation, with reference to the appended drawings wherein.

DETAILED DESCRIPTION

As mentioned previously, an embodiment of the disclosure notably relates to an-ultra-wide-band pulse generator suitable for transmitting digital data, these data being formed with a flow of information elements such as $X1, X2, X3, \ldots, Xn-1, Xn$, and the indexes $1, 2, \ldots, n-1, n$ symbolizing the order of occurrence of these information elements in the data flow.

No limiting assumption is made a priori on the nature of these information elements.

Thus, each of the information elements may represent a value assumed in a binary system only including a zero value noted as 0, and a non-zero value noted as 1, in which case each information element is represented by a single bit.

But each of these information elements may also represent a value assumed in a ternary system including a zero value noted as 0 and two non-zero values of opposite signs, noted as −1 and 1, respectively.

In this latter case, each information element such as $Xn-1$ or $Xn$ is represented by two bits, i.e. an amplitude bit such as $An-1$ or $An$, and a sign bit such as $Sn-1$ or $Sn$, although the sign bit has no significance for the information element of zero value.

Figure 1:
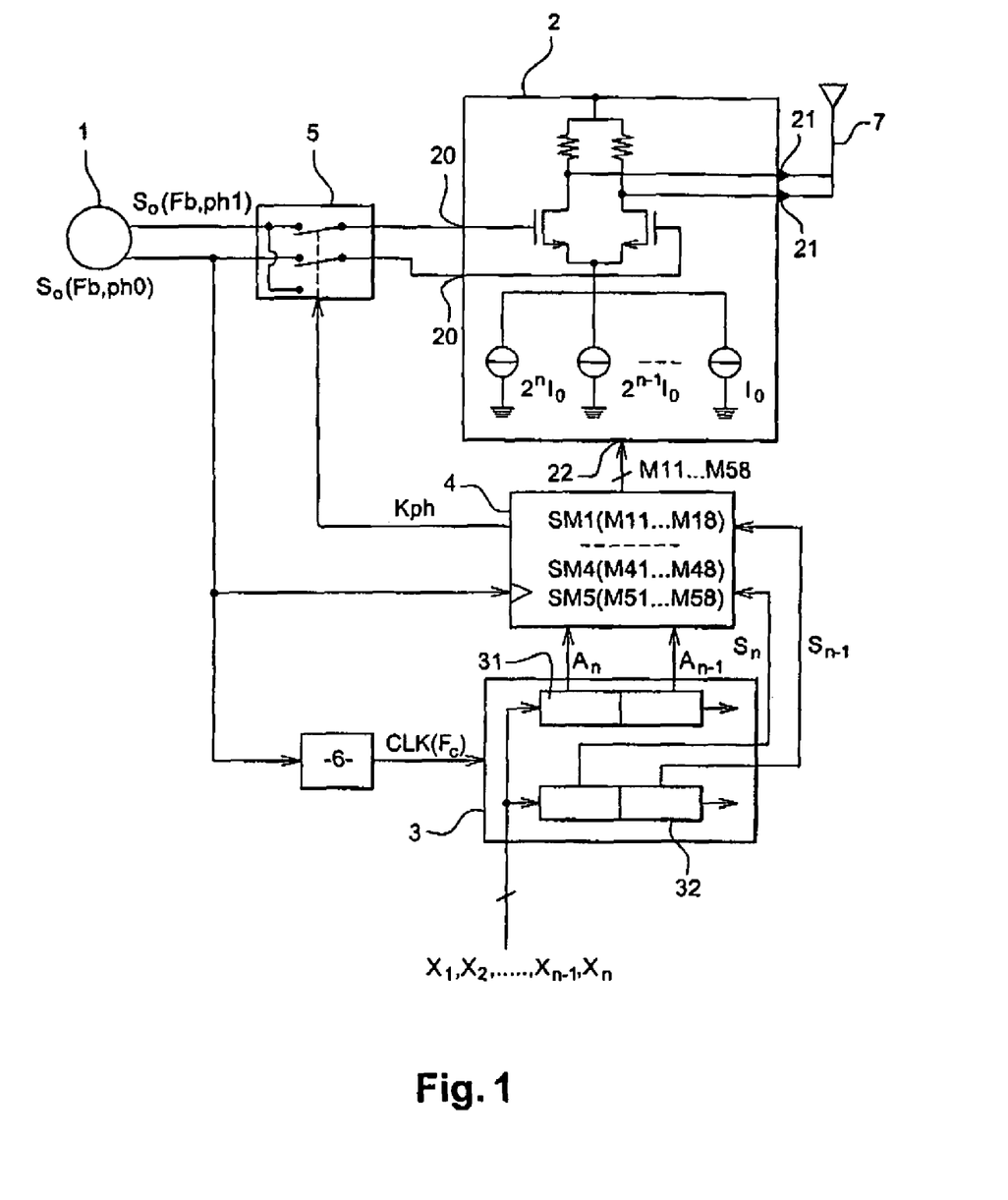
FIG. 1 is a diagram illustrating a generator according to a non-limiting embodiment of the disclosure.

FIG. 1 illustrates in a specific but non-limiting way, an embodiment of a generator suitable for transmitting ternary data, i.e. the information elements of which assume the values −1, 0, or 1.

To ensure its transmission, each of these information elements such as $X1, X2, Xn-1$ or $Xn$ is encoded for a corresponding time interval $t1, t2, tn-1$, or $tn$, as a pulse train.

Each encoding time interval is determined as the reciprocal of an encoding frequency Fc provided by a clock signal CLK.

The pulses encoding each information element form a pulse train, this pulse train being obtained by modulating a signal So from an oscillator 1 and oscillating at a base frequency Fb.

In practice, it is advisable that the base frequency Fb be at least equal to three times the encoding frequency Fc, so that each information element is represented by means of at least three cycles of the oscillating signal So.

In addition to the oscillator 1, the generator therefore comprises at least one modulator 2, the input 20 of which is coupled to the oscillator 1 in order to receive the oscillator signal So and which is able to apply to this oscillating signal So, over each time interval such as Tn, a modulation depending of the value of the information element such as Xn to be encoded during this time interval.

The output 21 of the modulator 2 is for example coupled to an antenna 7 allowing transmission of the flow of digital data by radio waves.

The embodiment of the generator further comprises at least one addressing circuit 3 and one encoding table 4, the modulator 2 being an amplitude modulator assuming the form of an amplifier with programmable gain.

The addressing circuit 3, which receives the flow $X1, X2, \ldots, Xn-1, Xn$ of digital data to be transmitted, is timed at the encoding frequency Fc by the clock signal CLK.

This addressing circuit 3 is designed so as to contain at each instant, a configuration of information elements including, as information elements, an information element already coded previously $Xn-1$ and an information element to be encoded $Xn$.

In the case illustrated in FIG. 1, where each information element such as $Xn-1$ or $Xn$, comprises an amplitude bit such as $An-1$ or $An$, and a sign bit such as $Sn-1$ or $Sn$, the addressing circuit 3 comprises for example a shift register 31 containing the configuration $An-1, An$ of amplitude bits, and a shift register 32 containing the configuration $Sn-1, Sn$ of sign bits.

The encoding table 4 is coupled to the addressing circuit 3 and contains at least four series, such as SM1-SM4, of digital words such as M11-M18, M21-M28, M3-M38 and M41-M48, each word representing an amplitude encoded over at least two bits.

This encoding table is further timed at the base frequency Fb of the signal So in this case stemming from the oscillator 1, but which may be produced by another oscillator (not shown).

Depending on the configuration of the information elements contained in the addressing circuit 3, the encoding table 4 selects at the beginning of each time interval such as tn, one of the series of digital words which it contains, and then sequentially provides during this time interval and at the rate defined by the base frequency Fb, the words from the selected series of digital words.

The amplifier, the gain of which is controlled by the digital words delivered by the encoding table 4 on its control input 22, applies at each pulse of the oscillating signal So, an amplitude modulation determined by the digital word which is provided to it by the encoding table 4 at the corresponding instant.

As each digital word encodes an amplitude, the words from a same series of digital words define an amplitude profile, expressed by a change in amplitude, possibly zero, of pulses modulated by the words from a same series of words.

Now, the series of digital words which the encoding table 4 selects over each time interval such as Tn is selected so as to encode, by different respective amplitude changes, different events which are formed by an identity of the information elements Xn−1 and Xn of the configuration contained in the addressing circuit 3, i.e. the event Xn=Xn−1 on the one hand, and a dissimilarity of these information elements, i.e. the event Xn≠Xn−1 on the other hand.

In other words, instead of individually encoding the different information elements X1, X2, etc. of the flow of data, it is proposed herein to modulate the oscillating signal So, at least in amplitude, depending on the identity or the dissimilarity of each information element relatively to the previous information element, i.e. to encode the transition or lack of transition between the information elements of each pair of successive information elements.

By this encoding strategy, each pulse train formed by the pulses of non-zero amplitude has a duration at least equal to twice the time interval such as tn, and the band width of the pulses delivered by the generator is considerably reduced as compared with the case when the information elements are individually encoded.

In yet other words, the pulses provided by the proposed generator are directly shaped ideally and without any filtering, so as to be comparable, although non-identical, with those that a pass-band filter set up on the output of a generator individually encoding the information elements would provide.

In the illustrated embodiment, the base frequency Fb of the signal So provided by the oscillator 1 is for example equal to 4 GHz, and the encoding frequency Fc provided by the clock signal CLK which clocks the addressing circuit 3, is for example equal to 500 MHz, i.e. one eight the base frequency.

Under these conditions, the signal CLK may be provided by a frequency divider 6 receiving the signal So and dividing this frequency by a factor 8. It would nevertheless be possible to alternatively use two uncorrelated oscillators, the first for timing the RF portion and the second for controlling the digital portion while having the same frequency Fb.

Also, each series, such as SM1-SM4, of digital words delivered by the encoding table 4 then comprises eight words, i.e. a number of words equal to the Fb/Fc ratio of the base frequency Fb to the coding frequency Fc.

In the case which corresponds to the illustrated embodiment, wherein each information element such as Xn represents a value assumed in a ternary system including a zero value, i.e. 0, and two non-zero values of opposite signs, i.e. −1 and 1, it may be advisable, in order to impart high diversity to the transmitted signal, to provide the proposed generator with a phase modulator 5, for example interposed between the oscillator 1 and the amplitude modulator 2.

Nevertheless, as those skilled in the art will understand upon reading the present description, the generator would not be functionally modified if the place of the modulators 2 and 5 were reversed.

The phase modulator 5 is designed in order to apply to the oscillating signal So which it receives from the oscillator 1 and which it transfers to the amplitude modulator 2, during each time interval such as tn, a phase modulation which depends at least on the sign Sn of the information element Xn to be encoded during this time interval tn.

For example, the oscillator 1 simultaneously provides two versions of the oscillating signal So, the first version having a phase ph0, and the second version being of opposite phase with the first and having a phase ph1.

The phase modulator 5 is controlled by a control signal Kph provided by the encoding table 4 depending on all or part of the configuration of signs Sn−1, Sn contained in the shift register 32.

The input 20 of the amplifier 2 is of the differential type, and the phase modulator 5 is controlled by the control signal Kph in order to apply in one sense or in the reverse sense, the phases ph0 and ph1 of the oscillating signal So on this differential input 20.

Figure 2:
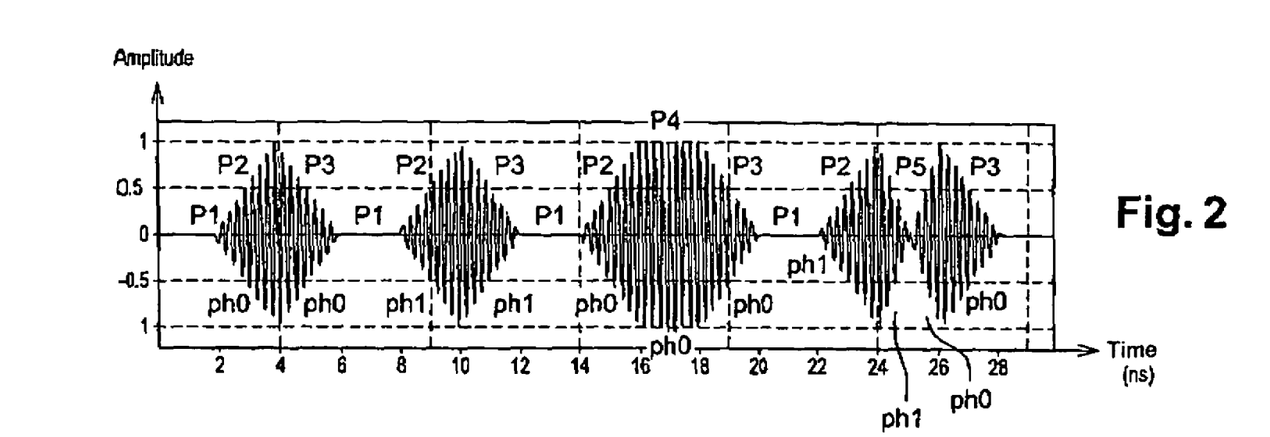
FIG. 2 is a diagram illustrating, versus the time expressed in nanoseconds, the amplitude of the pulses of a first type (triangular), capable of being produced as an output signal by the generator of FIG. 1 according to an embodiment of the disclosure.

Depending on whether the information elements such as Xn are binary or ternary, the encoding table 4 contains four or five series of digital words, such as SM1, SM2, SM3, SM4 and SM5, the respective words of which form different respective amplitude profiles such as P1-P4 and P5 as shown in FIG. 2.

These profiles may comprise a flat profile P1 of zero amplitude, an increasing profile P2 from zero amplitude to a determined non-zero amplitude, a decreasing profile P3 from the determined non-zero amplitude to the zero amplitude, a flat profile P4 of non-zero amplitude, and in the case of five series, an decreasing-increasing profile P5 ranging between the non-zero amplitude and zero amplitude.

By convention, the expression "zero amplitude" is to be understood as encompassing any amplitude deviation less than the jump represented by the transition between a strictly zero amplitude and the determined non-zero amplitude.

Also, the expression "flat profile" designates here not only a profile free of any change in amplitude, but encompasses any profile over the time interval, characterized both by an amplitude deviation less than the jump represented by the transition between a strictly zero amplitude and the determined non-zero amplitude and by a substantially identical amplitude at the beginning and at the end of this time interval.

For example, the encoding table 4 may deliver the words M11-M18 from the series of words SM1 having the flat profile P1 of zero amplitude in response to a repetition of the information element 0 of zero value, and deliver the words M41-M48 from the series of words SM4 having the flat profile P4 of non-zero amplitude in response to a repetition of a 1 or −1 information element of non-zero value.

Also, the encoding table 4 may deliver the words M21-M28 from the series of words SM2 having the increasing profile P2 in response to the occurrence of a 1 or −1 information element of non-zero value following the 0 information element of zero value, and delivering the words M3-M38 from the series of words SM3 having the decreasing profile P3 in response to the occurrence of the 0 information element of zero value following an a 1 or −1 information element of non-zero value.

In the case when the information elements are ternary, the encoding table 4 for example delivers the words M51-M58 from the series of words SM5 having the decreasing-increasing profile P5 in response to the occurrence of an information element Xn bearing a first + or − sign following the information element Xn−1 bearing the + or − sign opposite to the first sign.

Nevertheless in this case, it may be advisable to arrange things so that the phase change controlled by the control signal Kph for encoding the transition from one sign to the other, and marking the transition between the information elements of opposite signs, takes place at the middle of the time interval covered by this decreasing-increasing profile, at the instant when the amplitude is minimal.

Thus, an embodiment of the transmission method may be applied by providing that the events which are made up by the identity and dissimilarity of each information element, relatively to the preceding information element, are encoded by stability and a change in amplitude of the oscillating signal, respectively, or vice versa, the term "stability" to be understood here as the distinctive characteristic of a flat profile as defined earlier.

FIG. 2 illustrates the pulse train emitted by a generator as illustrated in FIG. 1, the encoding table 4 of which contains series corresponding to a linear profile, the pulse of which is of the triangular type.

The flow of encoded data is formed with ternary information elements 0, 1, 0, 0, −1, 0, 0, 1, 1, 0, 0, −1, 1, 0.

As shown by these figures, this flow is encoded by the succession of profiles P1 (for 0), P2 with a base polarity ph0 (for the transition 01), P3 with the base polarity ph0 (for the transition 10), P1 (for repetition of 0), P2 with reverse polarity ph1 (for the transition 0 −1), P3 with reverse polarity ph1 (for the transition −1 0), P1 (for repetition of 0), P2 with a base polarity ph0 (for the transition 01), P4 with a base polarity ph0 (for repetition of 1), P3 with base polarity ph0 (for the transition 10), P1 (for repetition of 0), P2 with reverse polarity ph1 (for the transition 0 −1), P5 beginning with the base polarity ph0 and ending with the reverse polarity ph1 (for the transition −11), and P3 with base polarity ph0 (for the transition 10).

As the coding frequency is 500 MHz in the illustrated example, each series of digital words, i.e. each profile, lasts for 2 nanoseconds.

However, as shown by FIG. 2, the pulse trains of non-zero amplitude formed by the sequences of profiles such as P2-P3, P2-P4-P3, or further P2-P5-P3, have a minimum duration of 4 nanoseconds, i.e. a duration at least equal to twice that of the time interval of 2 nanoseconds.

Figure 3:
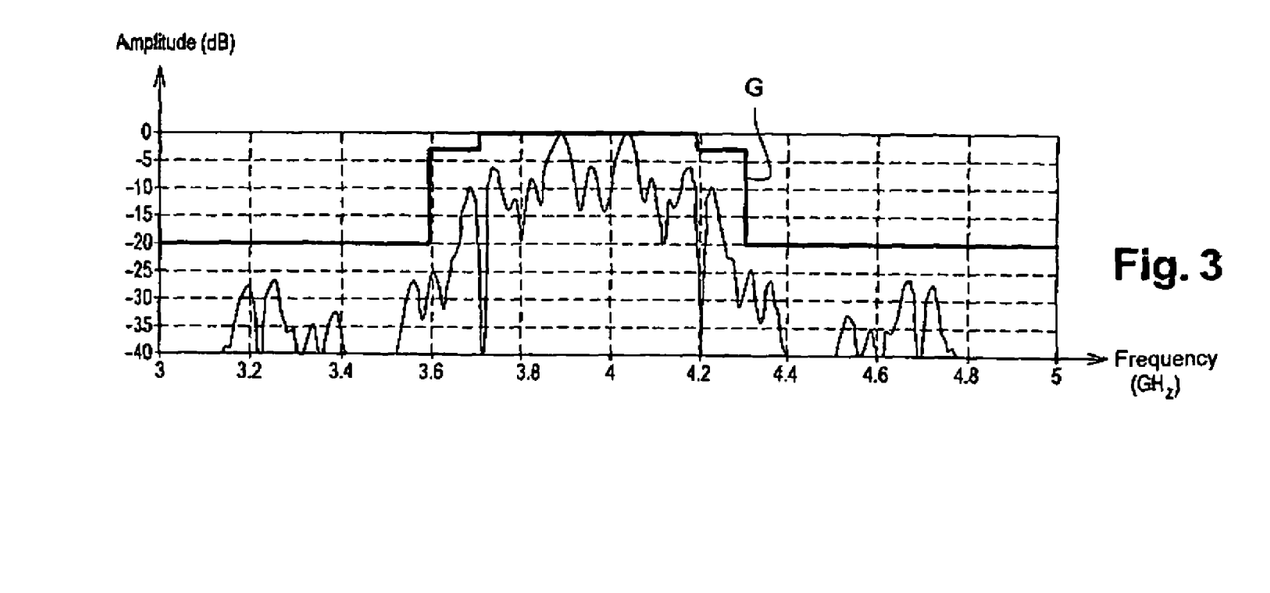
FIG. 3 is a spectrogram illustrating, versus the frequency expressed in gigahertz, the amplitude expressed in decibels of the frequency components of the signal illustrated in FIG. 2 according to an embodiment of the disclosure.

FIG. 3 illustrates the spectrum of the pulse train, illustrated in FIG. 2, examination of this spectrum showing that it comes within the template G for authorized frequencies.

Figure 4:
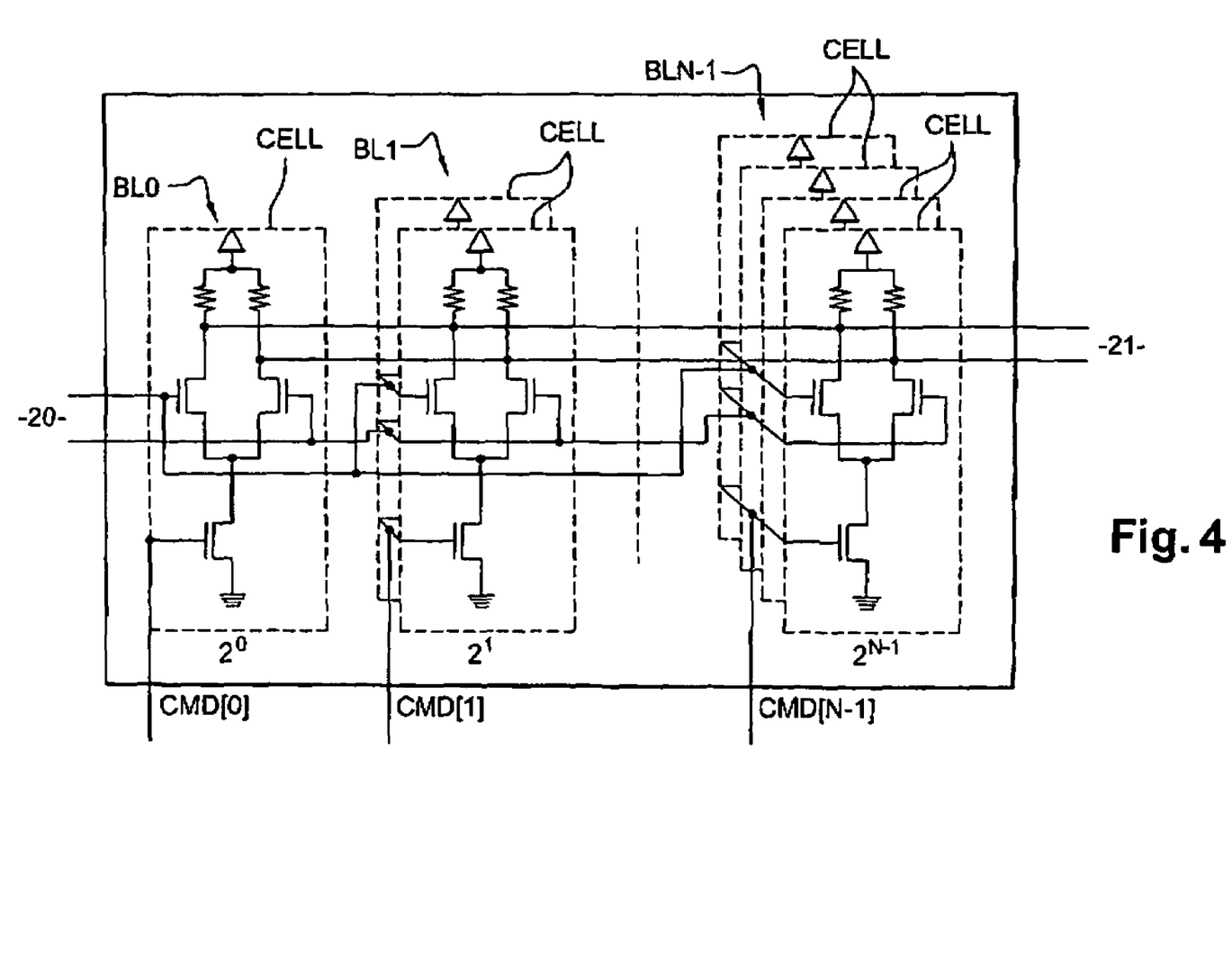
FIG. 4 is a diagram illustrating a particular embodiment of the amplitude modulator which may be used in a generator of the type illustrated in FIG. 1.

FIG. 4 is a diagram illustrating another embodiment of the amplitude modulator 2.

In this embodiment, the modulator 2 includes a set of identical cells CELL organized in successive blocks BL0, BL1, BLN−1, etc.

The first block BL0 for example comprises a single CELL, and each block starting with the second includes a number of cells twice the number of cells of the previous block.

Each block is enabled or disabled by a control signal, such as CMD[0], CMD[1], CMD[N−1], which is formed by the bit of the digital word M11-M58, the order of which corresponds to the order of this block in the ordered set of blocks.

By this arrangement, each block, when it is active, contributes to the total gain of the amplitude modulator 2 in proportion with the number of cells which this block contains.

The generators of FIG. 1 and FIG. 4 may each form part of a transmitter, which may form part of a system such as a communication system. Furthermore, the generator may be formed on one or more integrated circuits (ICs) that may include or be coupled to a controller. Furthermore, although shown as generating radio signal, the generators of FIGS. 1 and 4 may generate another type of signal such as an optical signal.

From the foregoing it will be appreciated that, although specific embodiments of the disclosure have been described herein for purposes of illustration, various modifications may be made without deviating from the spirit and scope of the disclosure.

What is claimed is:

1. An ultra-wide-band pulse generator, comprising:
   a generator suitable for transmitting digital data arranged in groups of information elements, each element comprising a value encoded in a pulse train during time intervals reciprocal of an encoding frequency, the pulse train obtained by modulating a signal from an oscillator having a base frequency at least equal to three times the encoding frequency,
   a modulator connected to the oscillator and operable to modulate the pulse train by applying the oscillating signal over each time interval, the modulation depending at least on the value of the information element to be encoded during each time interval,
   an addressing circuit and an encoding table, the addressing circuit having a configuration of information elements including at least one information element encoded previously and at least one unencoded information element, the encoding table connected to the addressing circuit and including at least four series of digital words, each word representing an amplitude encoded on at least two bits, the encoding table operable to sequentially provide, during each time interval, digital words selected from a series of digital words in the encoding table depending on the configuration of information elements contained in the addressing circuit,
   wherein the modulator comprises an amplitude modulator that includes a digital control amplifier, the gain of which is controlled by the digital words provided by the encoding table, and the series of digital words selected over each time interval by the encoding table being encoded by different respective amplitude changes, the different events formed by an identity and by a dissimilarity of the information elements of the configuration contained in the addressing circuit, as a result of which the passband of the pulses delivered by the generator is reduced, and
   wherein each series of digital words comprises a number of words equal to the integer ratio of the base frequency to the encoding frequency.

2. The pulse generator according to claim 1, wherein the encoding table is operable to deliver the digital words at the base frequency.

3. An ultra-wide-band pulse generator, comprising:
   a generator suitable for transmitting digital data arranged in groups of information elements, each element comprising a value encoded in a pulse train during time intervals reciprocal of an encoding frequency, the pulse train obtained by modulating a signal from an oscillator having a base frequency at least equal to three times the encoding frequency,
   a modulator connected to the oscillator and operable to modulate the pulse train by applying the oscillating signal over each time interval, the modulation depending at least on the value of the information element to be encoded during each time interval, an addressing circuit and an encoding table, the addressing circuit having a configuration of information elements including at least one information element encoded previously and at least one unencoded information element, the encoding table connected to the addressing circuit and including at least four series of digital words, each word representing an amplitude encoded on at least two bits, the encoding table operable to sequentially provide, during each time interval, digital words selected from a series of digital words in the encoding table depending on the configuration of information elements contained in the addressing circuit, wherein the modulator comprises an amplitude modulator that includes a digital control amplifier, the gain of which is controlled by the digital words provided by the encoding table, and the series of digital words selected over each time interval by the encoding table being encoded by different respective amplitude changes, the different events formed by an identity and by a dissimilarity of the information elements of the configuration contained in the addressing circuit, as a result of which the passband of the pulses delivered by this the generator is reduced, and wherein the digital words of the series contained in the encoding table form different respective amplitude profiles, the profiles each respectively comprising one of a flat profile of zero amplitude, an increasing profile from zero amplitude to a non-zero amplitude, a decreasing profile from the non-zero amplitude to zero amplitude, and a flat profile of non-zero amplitude.

4. The pulse generator according to claim 3, wherein each information element represents a value assumed in a system including a zero value and at least one non-zero value, in that the encoding table delivers the words from the series of words having the flat profile of zero amplitude in response to a repetition of the information element of zero value, and in that the encoding table delivers the words from the series of words having the flat profile of non-zero amplitude in response to a repetition of an information element of non-zero value.

5. The pulse generator according to claim 3, wherein each information element represents a value assumed in a system including a zero value and at least one non-zero value, wherein the encoding table delivers the words from the series of words having the increasing profile in response to the occurrence of an information element of non-zero value following the information element of zero value, and wherein the encoding table delivers the words from the series of words having the decreasing profile in response to the occurrence of the information element of zero value following an information element of non-zero value.

6. The pulse generator according to claim 1 further comprising a phase modulator positioned downstream from the oscillator, in that each information element represents a value assumed in a ternary system including two values of opposite signs, and wherein this phase modulator applies to the oscillating signal which it receives from the oscillator or from the amplitude modulator, during each time interval, a phase modulation depending at least on the sign of the information element to be encoded during this time interval.

7. The pulse generator according to claim 6, wherein
the encoding table contains five series of digital words, the respective words of which form five different respective amplitude profiles.

8. The pulse generator according to claim 3, wherein the amplitude profiles comprise a decreasing-increasing profile ranging between the non-zero amplitude and zero amplitude.

9. The pulse generator according to claim 8, wherein
the encoding table delivers the words from the series of words having the decreasing-increasing profile in response to the occurrence of an information element bearing a first sign following the information element (+ or −) sign opposite to the first sign.

10. The pulse generator according to claim 1 wherein the amplitude modulator comprises a set of identical cells organized in successive blocks, each of which starting with the second includes a number of cells twice the number of cells of the preceding block, in that these blocks are selectively enabled or disabled by respective control signals respectively formed by the successive bits of each of the digital words provided by the encoding table, and wherein each block, when it is active, contributes to the gain of this amplitude modulator in proportion with the number of cells which it contains.

11. A signal generator, comprising:
a profile circuit configured to receive a sequence of data elements arranged in groups of data elements such that each group is less than the whole sequence and including at least a first group and a second group, the profile circuit further configured to provide a respective signal profile for each group of multiple data elements within the sequence such that the first group is associated with a first profile and the second group is associated with a second profile that is different than the first profile; and
an amplifier coupled to the profile circuit, configured to receive a carrier signal, and configured to modulate the carrier signal according to the respective signal profiles.

12. The signal generator of claim 11 wherein each of the data elements comprises a respective binary value.

13. The signal generator of claim 11 wherein each of the data elements comprises a respective ternary value.

14. The signal generator of claim 11 wherein each signal profile comprises an amplitude profile.

15. The signal generator of claim 11 wherein each signal profile comprises a phase profile.

16. The signal generator of claim 11 wherein each group of data elements comprises a respective pair of consecutive data elements within the sequence.

17. The signal generator of claim 11 wherein the amplifier comprises:
a differential stage operable to receive the carrier signal and having a bias node; and
a bias source operable to provide to the bias node a bias signal that is related to the signal profiles.

18. The signal generator of claim 11 wherein the amplifier comprises:
respective groups of differential stages, each group operable to receive the carrier signal, having a respective control node, and having a respective number of the differential stages; and
a control circuit coupled to the control nodes and operable to activate the groups of differential stages in response to the signal profiles.

19. The signal generator of claim 11 wherein the amplifier comprises:
respective groups of differential stages, each group operable to receive the carrier signal, having a respective control node, and having a respective number of the differential stages, each number being a respective power of two; and
a control circuit coupled to the control nodes and operable to activate the groups of differential stages in response to the signal profiles.

20. The signal generator of claim 11 wherein the profile circuit is operable to generate the signal profiles in response to the carrier signal.

21. The signal generator of claim 11 wherein the profile circuit comprises a look-up table operable to store the signal profiles, to receive the data elements of the sequence, and to provide the stored signal profiles to the amplifier in response to the received data elements.

22. A signal generator, comprising:
a profile circuit operable to receive a sequence of data elements arranged in groups of data elements and to provide a respective signal profile for each group of multiple data elements within the sequence; and
an amplifier coupled to the profile circuit, operable to receive a carrier signal, and operable to modulate the carrier signal according to the respective signal profiles;
wherein the profile circuit comprises a memory operable to serially receive and store groups of the data elements in response to a clock having a frequency that is an integer fraction of a frequency of the carrier signal.

23. The signal generator of claim 11 wherein the profile circuit comprises a phase shifter operable to shift a phase of the carrier signal received by the amplifier.

24. A signal generator, comprising:
a profile circuit operable to receive a sequence of data elements arranged in groups of data elements and to provide a respective signal profile for each group of multiple data elements within the sequence; and
an amplifier coupled to the profile circuit, operable to receive a carrier signal, and operable to modulate the carrier signal according to the respective signal profiles;
wherein the profile circuit is operable to provide:
a first signal profile comprising a constant signal amplitude in response to a first group of data elements;
a second signal profile comprising a signal amplitude having a slope of a first polarity in response to a second group of data elements; and
a third signal profile comprising a signal amplitude having a slope of a second polarity in response to a third group of data elements.

25. A signal generator, comprising:
a profile circuit operable to receive a sequence of data elements arranged in groups of data elements and to provide a respective signal profile for each group of multiple data elements within the sequence; and
an amplifier coupled to the profile circuit, operable to receive a carrier signal, and operable to modulate the carrier signal according to the respective signal profiles;
wherein the profile circuit is operable to provide:
a first signal profile comprising a constant signal amplitude in response to a first group of data elements;
a second signal profile comprising a signal amplitude having a slope of a first polarity in response to a second group of data elements;
a third signal profile comprising a signal amplitude having a slope of a second polarity in response to a third group of data elements; and
a fourth signal profile comprising a signal amplitude having a slope of one of the first and second polarities followed by a slope of the other of the first and second polarities.

26. An integrated circuit, comprising:
a transmitter, comprising a signal generator that includes
a profile circuit configured to receive a sequence of data elements arranged in groups of data elements such that each group is less than the whole sequence and including at least a first group and a second group, the profile circuit further configured to provide a respective signal profile for each group of multiple data elements within the sequence such that the first group is associated with a first profile and the second group is associated with a second profile that is different than the first profile, and
an amplifier coupled to the profile circuit, configured to receive a carrier signal, and configured to modulate the carrier signal according to the respective signal profiles.

27. The integrated circuit of claim 26, further comprising a data circuit coupled to the transmitter and operable to generate the sequence of data elements.

28. The integrated circuit of claim 26, further comprising an oscillator operable to generate the carrier signal.

29. A system, comprising:
a first integrated circuit, comprising
a transmitter, comprising a signal generator that includes
a profile circuit configured to receive a sequence of data elements arranged in at least a first group of data elements and a second group of data elements and to provide a first signal profile for the first group and a second profile different from the first profile for the second group within the sequence, and
an amplifier coupled to the profile circuit, configured to receive a carrier signal, and configured to modulate the carrier signal according to the respective signal profiles; and
a second integrated circuit coupled to the first integrated circuit.

30. The system of claim 29 wherein the second integrated circuit comprises a controller.

31. The system of claim 29 wherein the first and second integrated circuits are disposed on respective dies.

32. The system of claim 29 wherein the first and second integrated circuits are disposed on a same die.

33. A method, comprising:
receiving groups of sequential data elements; and
generating a signal having sequential signal segments that each correspond to a respective one of the groups of data elements, each segment having a respective profile that corresponds to the data elements within the corresponding group such that at least two groups have differing profiles.

34. The method of claim 33 wherein generating the signal comprises modulating a carrier signal according to the profiles of the signal segments.

35. The method of claim 33 wherein generating the signal comprises generating the signal segments each having a respective amplitude profile.

36. A method, comprising:
receiving groups of sequential data elements; and
generating a signal having sequential signal segments that each correspond to a respective one of the groups of data elements, each segment having a respective profile that corresponds to the data elements within the corresponding group; wherein generating the signal comprises modulating a carrier signal at a modulation frequency according to the profiles of the signal segments; and
the carrier signal has a carrier frequency that is at least three times the modulation frequency.

37. The method of claim 33 wherein generating the signal comprises generating each signal segment having a profile that depends on an order of the data elements within the group of data elements corresponding to the signal segment.

38. The method of claim 33 wherein generating the signal comprises generating each signal segment having a profile that depends on values of the data elements within the group of data elements corresponding to the signal segment.

39. The method of claim 33 wherein generating the signal comprises generating each signal segment having a profile that depends on polarities of the data elements within the group of data elements corresponding to the signal segment.

* * * * *